E. R. REESER.
DEVICE FOR CLEANING PIPE LINES.
APPLICATION FILED OCT. 16, 1903. RENEWED NOV. 19, 1907.
929,110.
Patented July 27, 1909.
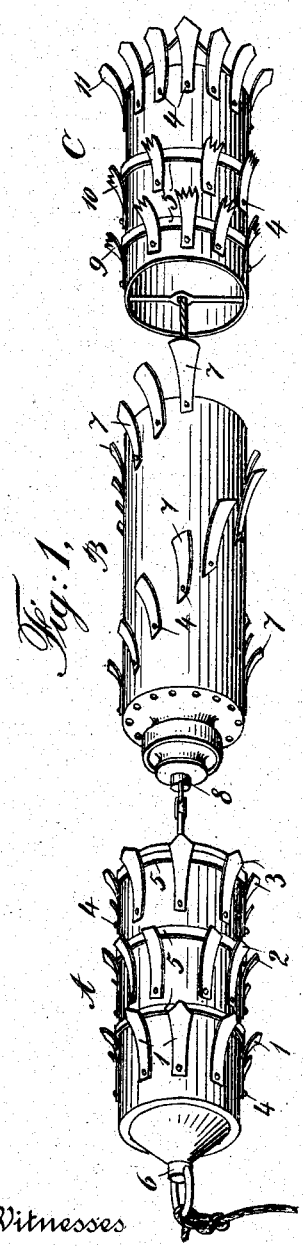
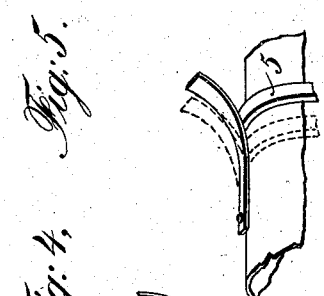
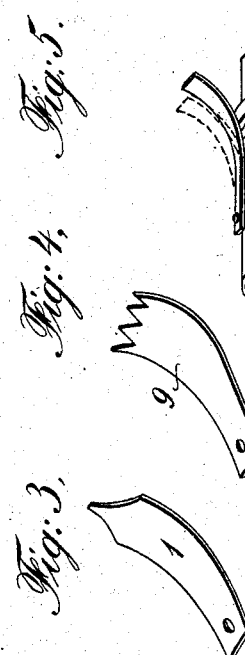
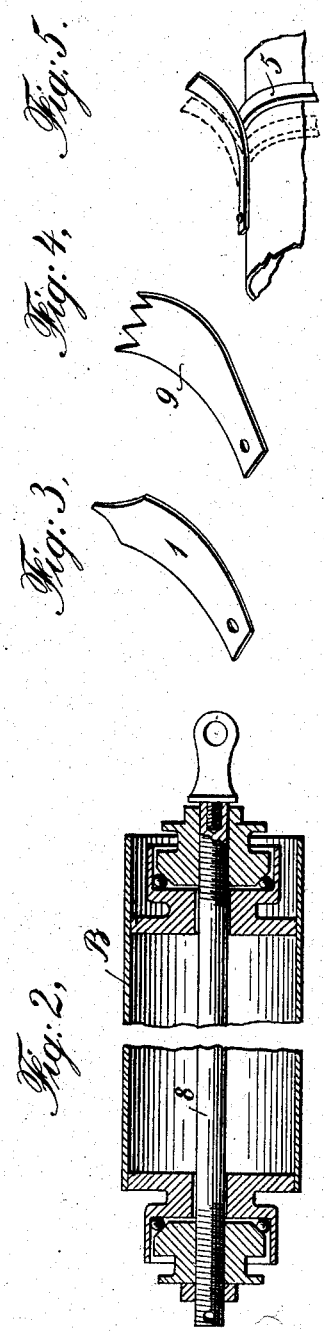
Witnesses
Edward R. Reeser,
Inventor,
by Claude A. O'Rosell
Attorney

UNITED STATES PATENT OFFICE.

EDWARD R. REESER, OF TAMAQUA, PENNSYLVANIA, ASSIGNOR, BY MESNE ASSIGNMENTS, TO NATIONAL WATER MAIN CLEANING COMPANY, OF NEW YORK, N. Y., A CORPORATION OF MAINE.

DEVICE FOR CLEANING PIPE-LINES.

No. 929,110.      Specification of Letters Patent.      Patented July 27, 1909.

Application filed October 16, 1903, Serial No. 177,287. Renewed November 19, 1907. Serial No. 402,910.

*To all whom it may concern:*

Be it known that I, EDWARD R. REESER, a citizen of the United States, and a resident of Tamaqua, in the county of Schuylkill and State of Pennsylvania, have invented a certain new and useful Improvement in Devices for Cleaning Pipe-Lines, of which the following is a specification.

This invention relates to an improvement in devices for cleaning pipe lines as will be more fully explained, reference being had to the accompanying drawing, in which:

Figure 1, is a perspective view showing the complete device. Fig. 2, is an enlarged section of the middle spindle, showing the bearings and the shaft upon which it revolves. Fig. 3, is a detail view of one of the cutters of the front spindle. Fig. 4, is a detail view of one of the toothed scrapers of the rear spindle. Fig. 5, is a detail view showing a cutter, a bolt holding it in place and an adjustable collar whereby the cutter may be raised when desired.

In the drawings, A, B, and C indicate the three spindles in the preferred order in which they are attached and in which they are used in practice, a cord or rope being attached to the front spindle A, to pull the three spindles forward in the pipe line to be cleaned. The spindle A is flexibly connected with the spindle B, by means of a cord or chain, and the spindle B is in like manner flexibly connected with the spindle C.

On the spindle A there are three series of cutters, 1, 2 and 3, circularly arranged, each cutter being held in place by means of one or more bolts 4. Back of the cutters and scrapers on spindles A and C may be placed movable collars 5, by means of which the cutters may be raised so as to increase their peripheral extension whenever it is desired to clean a pipe of larger diameter than that for which these spindles are designed under normal conditions. These collars may be made removable, so that they may ordinarily be omitted, and applied only when needed. A shaft 6 passes through the spindle A, at the ends of which are loops to which ropes are attached as shown.

On the spindle B there is a series of scrapers 7 arranged in the form of one or more helixes, two being shown in the drawing. By the motion of the spindle B and also by the passage of water through the pipe line the spindle B is made to revolve and dislodge matter loosened by the cutters of the first or front spindle. The spindle B is mounted revolubly on a shaft 8 in such a way that on being pulled through the pipe line there is no strain on it except that which is caused by friction against the pipes and the obstructions attached thereto. To make the spindle B revolve easily it is preferably supplied with ball bearings. At each end of shaft 8 are loops or eyes by means of which it is connected with the front and rear spindles. The spindles A and B are preferably closed at each end.

The spindle C is supplied with three series of scrapers, 9, 10 and 11, some of which may be toothed or serrated at their outer ends, the scrapers of the first two series of this spindle, being illustrated as of this construction. The spindle C is preferably open at both ends so as to readily allow matter that has been detached from the interior of the pipes to be washed through the same and carried off. At the front of the spindle C is a loop or eye by means of which it is flexibly connected with the spindle B by means of a rope or chain, and at its rear it may be supplied with an angular brace.

In practice the device is introduced into a pipe line through an aperture, a rope is attached to the front of the spindle A and the three spindles are pulled for a short distance, say twenty feet or more. Water is then passed through the pipe line over the spindles, whereby the loosened matter, sediment, vegetable growths etc. are washed out. The device is then pulled forward another distance and the operation of flushing is repeated. On account of the flexible connections the device can readily be passed through an angle or curve in the pipe line.

On account of the spindle C being hollow any matter that has been loosened by the cutters and scrapers on the two spindles that precede it is readily removed. The cutters and scrapers are preferably made of spring steel. It is to be understood that I do not wish to limit myself to the number of spindles or sets of cutters or scrapers nor to the shape or configuration given to the cutters or scrapers.

What I claim as new is:

1. In a pipe-cleaning apparatus, the combination of a non-rotatable body, cutters thereon, a member connected thereto and a scraping body revolubly mounted on said member about a substantially longitudinal axis and arranged to be moved about such axis by the passage of the apparatus through a pipe.

2. In an apparatus for cleaning water pipes, the combination of a non-rotatable longitudinally moving head and a rotatably mounted body connected thereto and cutters and scrapers carried on said head and body respectively, the scrapers being constructed and arranged to induce rotation of said body.

3. A device of the character described consisting of a cylinder carrying cutters circularly arranged, a rotatable spindle flexibly connected therewith and carrying helically arranged scrapers and another spindle, flexibly connected with the rotatable spindle and carrying circularly arranged scrapers.

4. A device of the character described consisting of three spindles, flexibly connected, the first spindle being closed at both ends and supplied with cutters circularly arranged, the second spindle being rotatable and supplied with scrapers helically arranged and the third spindle being open at both ends and supplied with toothed scrapers circularly arranged.

5. A device of the character described, consisting of a cylinder, carrying upon its convex surface cutters circularly arranged, a rotatable cylinder flexibly connected therewith and carrying helically arranged scrapers, and a third cylinder flexibly connected with the rotatable cylinder and carrying circularly arranged scrapers.

6. In an apparatus for cleaning water pipes the combination of a non-rotatable cutting body, a continuously rotatable body adapted to be rotated by movement of the device through the pipe, and means on said body for cleaning the pipes.

7. In an apparatus for cleaning water pipes the combination of a non-rotatable body, a continuously rotatable body connected thereto adapted to be rotated by movement of the device through the pipes, and cutters and scrapers carried on said bodies, respectively.

8. In a pipe-cleaning apparatus, the combination of a non-rotatable body, cutters thereon, a member connected thereto and a scraping body revolubly mounted on said member about an axis at a substantial angle with the diameter of the pipe to be cleaned and arranged to be moved about such axis by the passage of the apparatus through a pipe.

9. In a pipe-cleaning apparatus, the combination of a non-rotatable body, cutters thereon, a member connected thereto and a scraping body revolubly mounted on said member and arranged to be rotated substantially continuously in a definite direction by the movement of the cleaning apparatus through a pipe.

10. In a pipe-cleaning apparatus, the combination of a non-rotatable body, cutters thereon, a member connected thereto and a scraping body revolubly mounted on said member and arranged to be given a definite movement in a direction substantially at right angles to the axis of the pipe to be cleaned.

11. In a pipe cleaning apparatus, a non-rotatable body, cutters thereon adapted to engage the inside of the pipe, a shaft connected to the non-rotatable body, a second body loosely mounted upon said shaft and scrapers upon said second body arranged to engage the inside of the pipe and induce a definite movement of said second body.

12. In a pipe cleaning apparatus, a non-rotatable body, cutters thereon adapted to engage the inside of the pipe, a revoluble body connected to the non-rotatable body, and scrapers upon the revoluble body constructed to induce a definite rotary movement to the revoluble body by the movement of the apparatus through the pipe.

13. In an apparatus for cleaning water pipes, the combination of a non-rotatable longitudinally moving cutting head and a rotatable body connected thereto, adapted to be rotated by the action of the water in the pipe, and means on said rotating body for cleaning the pipe.

Signed at New York in the county of New York and State of New York this 12th day of October A. D. 1903.

EDWARD R. REESER.

Witnesses:
 GEO. F. WHITNEY,
 B. F. KEINARD.